US006767999B2

(12) United States Patent
Smirnov et al.

(10) Patent No.: US 6,767,999 B2
(45) Date of Patent: Jul. 27, 2004

(54) ANTHOCYANTIN COLORING AGENT AND METHOD FOR THE PRODUCTION THEREOF FROM ORGANIC MATTER

(76) Inventors: Vitaly Alekseevich Smirnov, Apt. 76, 62/5, ul.G.Asaki, Kishinev (MD), 277028; Viktor Victorovich Sidorov, Apt. 157, ul. Yablochkova, 24, Moscow (RU), 127322; Valentina Vladimirovna Smirnova, Apt.76, 62/5, ul.G.Asaki, Kishinev (MD), 277028

( * ) Notice: Subject to any disclaimer, the term of this patent is extended or adjusted under 35 U.S.C. 154(b) by 0 days.

(21) Appl. No.: 10/019,194

(22) PCT Filed: Mar. 26, 2001

(86) PCT No.: PCT/RU01/00121

§ 371 (c)(1),
(2), (4) Date: Dec. 21, 2001

(87) PCT Pub. No.: WO01/81478

PCT Pub. Date: Nov. 1, 2001

(65) Prior Publication Data

US 2003/0036640 A1 Feb. 20, 2003

(30) Foreign Application Priority Data

Apr. 26, 2000 (RU) ........................................ 2000110391
Jan. 18, 2001 (RU) ........................................ 2001101588

(51) Int. Cl.$^7$ ........................ C07H 15/00; C07H 17/00; A21L 1/22; A23L 1/28
(52) U.S. Cl. ........................ 536/18.5; 536/8; 514/25; 514/27; 210/748; 426/253; 426/254; 426/489; 426/495
(58) Field of Search ........................ 210/748; 426/489, 426/490, 495, 253, 254; 568/717; 536/8, 18.5; 514/25, 27

(56) References Cited

U.S. PATENT DOCUMENTS

| | | | |
|---|---|---|---|
| 4,211,577 A | * | 7/1980 | Wallin et al. |
| 4,320,009 A | * | 3/1982 | Hilton et al. |
| 5,683,678 A | * | 11/1997 | Heckert et al. |
| 6,238,673 B1 | * | 5/2001 | Howard et al. |

FOREIGN PATENT DOCUMENTS

| | | |
|---|---|---|
| FR | 2290477 A | 6/1976 |
| GB | 8612587 A | 12/1986 |
| RU | 2057153 C1 | 3/1996 |
| RU | 2057774 C1 | 4/1996 |
| RU | 2077543 * | 4/1997 |
| RU | 2077543 C1 | 4/1997 |
| RU | 2099371 C1 | 12/1997 |
| RU | 2099376 C1 | 12/1997 |
| WO | WO 89/06671 A | 7/1989 |

OTHER PUBLICATIONS

A.N. Arkhypova, "Food colorants: properties and use", Food Ingredients, Primary Materials and Food Additives, pp. 38–41 (Jan. 2000).

* cited by examiner

Primary Examiner—James O. Wilson
Assistant Examiner—Traviss C. McIntosh, III
(74) Attorney, Agent, or Firm—Frishauf, Holtz, Goodman & Chick, P.C.

(57) ABSTRACT

Anthocyanic colorant made of vegetable primary material and process for its production relate to food, cosmetic, pharmaceutical and textile industry and may be used in production of alcoholic and soft drinks, confectionery, products made of sour milk, in coloring of tablet capsules, dying of children's underwear, toys, etc. According to the invention, pelargonidin glycoside was added to the composition of the natural colorant that contained cyanidin glycosides, peonidin glycosides, organic substance and mineral salts. The components percentage shall be as follows, %: cyanidin glycoside 0.1–8.6; peonidin glycoside 0.08–6.45 pelargonidin glycoside 0.005–4.3; organic substance and mineral salts—the rest. Due to the fact that the colorant solution contains pelergonidin glycoside further to cyanidin and peonidin glycosides, the proposed colorant obtained expanded color spectrum. Combination of these three anthocyans in the proposed colorant provides for the most rich spectrum of red colors. At the same time, the ratio of pelargonidin glycoside:peonidine glycoside:cyanidin glycoside must be 1:1.5:2, respectively, and it will provide for production of a colorant with a number of valuable physical properties. Namely, the colorant retains red color when pH of the environment is not more than 7, it is thermostable, photostable and maintains its properties during 2 (two) years, besides, its relative optical density is the highest when it is subjected to the light with wavelength of 505–515 nm. According to the invention, process of the colorant production implies that pre-dried vegetable maize-pulp containing anthocyan is grinded, extracted by a mix of aqueous solutions of hydrochloric and citric acids in the field of ultrasonic vibration. Then the extracted coloring matter is filtered and concentrated in vacuum. The primary material is additionally prepared for extraction by infusion of grinded material in extracting agent during 6–8 hours at the temperature of 35–40° C. Extraction may be performed in three steps. Processing for extraction of each lot shall be 30–40 minutes at the temperature of 35–40° C. The process makes the production technology easier and provides for additional source of primary materials. 2 independent claims, 8 dependent claims, 5 tables.

17 Claims, No Drawings

ANTHOCYANTIN COLORING AGENT AND METHOD FOR THE PRODUCTION THEREOF FROM ORGANIC MATTER

This application be the United States National Phase (35 USC 371) Application of International Application PCT/RU01/00121 filed Mar. 26, 2001 which was not published in English.

FIELD OF INVENTION

The invention relates to food, cosmetic, pharmaceutical and textile industry and it may be used in production of alcoholic and soft drinks, confectionery, products made of sour milk, for coloring of tablet capsules, dying of children's underwear, toys, etc.

BACKGROUND OF INVENTION

Anthocyanic colorants are known to be made of mulberries, grapes, black-currant, black ash-berries, hollyhock, cellular tissues of carrots (UK Patent Application No. 8612587, filed in 1986; RF Patent No. 2057153, 1996; Food Ingredients, Primary Materials and Food Additives No. 1, 2000). Besides, there are processes of producing anthocyanic colorants from various plants, for example red grapes, cake of black ash-berry, hollyhock petals, etc. Such colorants suffer from the following drawbacks: low content of coloring matter, low thermo- and photostability, limited spectrum of colors. At the same time, as it may be seen from the above said, the anthocyanic colorants are made of berries and their cake, i.e. seasonal and perishable materials, and it makes the colorants production a multi-step and complicated process technologically and expensive financially. So, the drawback of the above mentioned processes is that the colorant production is a multi-step process due to low pigment content in the primary material, and besides the process is not efficient for other types of primary materials (RF Patent No. 2099376 to V. M. Bolotov et al, 1995).

Natural edible colorant made of hollyhock petals is the closest prototype of the proposed one (international Application PCT/SU88/00009, grade C 09 B 61/00, dated Jan. 12, 1988, International Publication WO 89/06671 dated Jul. 27, 1989). This colorant is an extract from anthocyanic primary material that includes the following components: glycosides of cyanidin, peonidin, delphinidin, petunidin and/or malvidin. The closest method to the proposed one is colorant production from vegetable materials that includes extraction of anthocyanic materials by aqueous solution of acid and/or alcohol in ultrasonic vibration field, extract separation and concentration to get the final product (RF Patent No. 2077543 grade C09B61/00, 1994).

The drawback of this colorant is that it has low stability while being stored both in pure form and in products where it is used, besides, the mentioned colorant has limited spectrum of colors, which constricts the sphere of its application. Drawbacks of the above method include impossibility to obtain concentrated colorant, high consumption of extracting agent and low output from primary materials containing anthocyan.

SUMMARY OF INVENTION

The object of this invention is to obtain natural anthocyanic red colorant that will have a wide spectrum of colors, high thermo- and photo-stability, easy production process, that will be based on use of new primary materials, which provide for production of the colorant in any volume irrespective of season and any other factors.

The invention is based on the object to prepare edible colorant from vegetable primary materials by changing and selection of certain components ratio as well as by changing conditions of extraction process from vegetable primary materials, and to develop a process of production thereof. The colorant shall be of high quality, stability, shall have wide spectrum of colors, wide field of application, including production of non-alcoholic tonic of high quality and stable color.

The specified object is achieved by adding pelargonidin glycosides into natural colorant that contains cyanidin glycosides, peonidin glycosides, organic substance and mineral salts. The percentage of components mass shall be as follows, %:

| | |
|---|---|
| cyanidin glycoside | 0.1–8.6 |
| peonidin glycoside | 0.08–6.45 |
| pelargonidin glycoside | 0.005–4.3 |
| organic substance and mineral salts | the rest |

Due to the fact that the colorant solution contains pelergonidin glycoside further to cyanidin and peonidin glycosides, the proposed colorant has expanded color spectrum as it is known that cyanidin is of crimson color, peonidin is pink and purple and pelargonidin is scarlet. Combination of these three anthocyans in the proposed colorant shall provide for the most rich spectrum of red colors. At the same time the ratio of pelargonidin glycoside-:peonidine glycoside:cyanidin glycoside must be 1:1.5:2, respectively, and it will provide for preparation of a colorant with a number of important physical properties. Namely, the colorant remains red when pH of the environment is not more than 7, it is thermostable, photostable and maintains its properties during 2 (two) years, besides, its relative optical density will be the highest when it is subjected to the light with wavelength of 505–515 nm. The colorant prepared with the following components ratio has the form of transparent thick liquid of murrey color, which is completely soluble in water and aqueous solutions of ethyl alcohol, with a smell of the primary material and a sour taste. Percentage of dry substance mass is minimum 20, mass proportion of coloring matter is minimum 40 g/l. The proposed colorant is an extract from vegetable materials containing anthocyan. Diversity of its color spectrum shall be provided by different types of anthocyans, their volume and their ratio. Chromatographic examination confirmed that the colorant contained three basic anthocyanides, namely cyanidin (crimson), peonidin (pink and purple) and pelargonidin (scarlet). Organic substance and mineral salts were also discovered in the colorant solution. The proposed colorant has been tested for toxicity on laboratory animals. Testing results prove that the colorant does not contain toxic matter and makes no changes in condition of laboratory animals. Besides, the proposed colorant is an extract of vegetable materials, it contains bio active compounds extracted from primary material. Availability of bio active matter shall increase the quality of the proposed colorant.

EXAMPLES OF COLORANT COMPOSITION

Example No. 1

Primary material: vegetable maize-pulp containing anthocyan.

Colorant composition, %:

| | |
|---|---|
| cyanidin glycoside | 4.4 |
| peonidin glycoside | 3.3 |
| pelargonidin glycoside | 2.2 |
| organic substance and mineral salts | the rest |

The prepared colorant has been tested for resistance to various unfavorable factors such as: acid environment, freezing during 30 days, boiling for 3 hours, exposure to direct sunlight for 3 months. In this case, pH of the colorant solution varied between 2.0 to 10.0. Besides, absorption spectrum of the visible spectrum part was examined using spectrophotometer. For the results of performed tests see Table No. 1. As it may be seen from the presented data the proposed colorant shall have the following properties:

- it has maximum relative optical density at the wavelength of 515 nm
- it retains natural red color when exposed to environment with pH between 2.0 to 7.0
- resistant to freezing, i.e. it retains 95% of its natural color density after being frozen for 30 days
- it retains 90% of its natural color density after being boiled for 3 hours
- it retains 98% of its natural color density after being exposed to direct sunlight for 3 months
- content of anthocyans in the colorant corresponds to the following ratio, namely pelargonidin glycoside:peonidin glycoside:cyanidin glycoside must correlate as 1:1.5:2 respectively.

Example No. 2

Primary material: vegetable maize-pulp containing anthocyan.

Colorant composition, %:

| | |
|---|---|
| cyanidin glycoside | 0.1 |
| peonidin glycoside | 0.08 |
| pelargonidin glycoside | 0.05 |
| organic substance and mineral salts | the rest |

The prepared colorant has been tested for resistance to various unfavorable factors such as: acid environment, freezing during 30 days, boiling for 3 hours, exposure to direct sunlight for 3 months. In this case, pH of the colorant solution varied between 2.0 to 10.0. Besides, absorption spectrum of the visible spectrum part was examined using spectrophotometer. For the results of performed tests see Table No. 1. As it may be seen from the presented data the proposed colorant shall have the following properties:

- it has maximum relative optical density at the wavelength of 512 nm
- it retains natural red color when exposed to environment with pH between 2.0 to 7.0
- it is resistant to freezing, i.e. it retains 80% of its natural color density after being frozen for 30 days
- it retains 80% of its natural color density after being boiled for 3 hours
- it retains 80% of its natural color density after being exposed to direct sunlight for 3 months
- content of anthocyans in the colorant corresponds to the following ratio, namely pelargonidin glycoside:peonidin glycoside:cyanidin glycoside must correlate as 1:1.5:2 respectively.

Example No. 3

Primary material: vegetable maize-pulp containing anthocyan.

Colorant composition, %:

| | |
|---|---|
| cyanidin glycoside | 8.6 |
| peonidin glycoside | 6.45 |
| pelargonidin glycoside | 4.3 |
| organic substance and mineral salts | the rest |

The prepared colorant has been tested for resistance to various unfavorable factors such as: acid environment, freezing during 30 days, boiling for 3 hours, exposure to direct sunlight for 3 months. In this case, pH of the colorant solution varied between 2.0 to 10.0. Besides, absorption spectrum of the visible spectrum part was examined using spectrophotometer. For the results of performed tests see Table No. 1. As it may be seen from the presented data the proposed colorant shall have the following properties:

- it has maximum relative optical density at the wavelength of 513 nm
- it retains natural red color when exposed to environment with pH between 2.0 to 7.0
- it is resistant to freezing, i.e. it retains 90% of its natural color density after being frozen for 30 days
- it retains 95% of its natural color density after being boiled for 3 hours
- it retains 100% of its natural color density after being exposed to direct sunlight for 3 months
- contents of anthocyans in the colorant corresponds to the following ratio, namely pelargonidin glycoside:peonidin glycoside:cyanidin glycoside must correlate as 1:1.5:2 respectively.

Example No. 4

Primary material: plants containing anthocyan—hollyhock petals and cranberries.

The colorant was prepared using the known process (5) and it had the following composition, %:

| | |
|---|---|
| cyanidin glycoside | 8.6 |
| peonidin glycoside | 0.08 |
| pelargonidin glycoside | 3.6 |
| organic substance and mineral salts | the rest |

The prepared colorant has been tested for resistance to various unfavorable factors such as: acid environment, freezing during 30 days, boiling for 3 hours, exposure to direct sunlight for 3 months. In this case, pH of the colorant solution varied between 2.0 to 4.0. Besides, absorption spectrum of the visible spectrum part was examined using spectrophotometer. For the results of performed tests see Table No. 1. As it may be seen from the presented data the proposed colorant shall have the following properties:

- it has maximum relative optical density at the wavelength of 525 nm
- it retains natural red color when exposed to environment with pH between 2.0 to 4.0
- it is resistant to freezing, i.e. it retains 40% of its natural color density after being frozen for 30 days it retains 35% of its natural color density after being boiled for 3 hours it retains 50% of its natural color density after being exposed to direct sunlight for 3 months content of anthocyans in the colorant corresponds to the following ratio, namely pelargonidin glycoside:peonidin glycoside:cyanidin glycoside must correlate as 1:0.002:2.3 respectively.

Example No. 5

Primary material: grapes and strawberries containing anthocyan.

The colorant was prepared using the known process (5) and it had the following composition, %:

| cyanidin glycoside | 0.1 |
|---|---|
| peonidin glycoside | 0.05 |
| pelargonidin glycoside | 9.0 |
| organic substance and mineral salts | the rest |

The prepared colorant has been tested for resistance to various unfavorable factors such as: acid environment, freezing during 30 days, boiling for 3 hours, exposure to direct sunlight for 3 months. In this case, pH of the colorant solution varied between 2.0 to 5.0. Besides, absorption spectrum of the visible spectrum part was examined using spectrophotometer. For the results of performed tests see Table No. 1. As it may be seen from the presented data the proposed colorant shall have the following properties:

it has maximum relative optical density at the wavelength of 540 nm it retains natural red color when exposed to environment with pH between 2.0 to 5.0 it is resistant to freezing, i.e. it retains 30% of its natural color density after being frozen for 30 days it retains 25% of its natural color density after being boiled for 3 hours it retains 60% of its natural color density after being exposed to direct sunlight for 3 months content of anthocyans in the colorant corresponds to the following ratio, namely pelargonidin glycoside:peonidin glycoside:cyanidin glycoside must correlate as 1:0.006:0.01 respectively.

Example No. 6

Primary material: strawberries containing anthocyan.

The colorant was prepared using the known process (5) and it had the following composition, %:

| cyanidin glycoside | 0.15 |
|---|---|
| peonidin glycoside | 0.1 |
| pelargonidin glycoside | 0.05 |
| organic substance and mineral salts | the rest |

The prepared colorant has been tested for resistance to various unfavorable factors such as: acid environment, freezing during 30 days, boiling for 3 hours, exposure to direct sunlight for 3 months. In this case, pH of the colorant solution varied between 2.0 to 6.0. Besides, absorption spectrum of the visible spectrum part was examined using spectrophotometer. For the results of performed tests see Table No. 1. As it may be seen from the presented data the proposed colorant shall have the following properties:

it has maximum relative optical density at the wavelength of 516 nm it retains natural red color when exposed to environment with pH between 2.0 to 6.0 it is resistant to freezing, i.e. it retains 90% of its natural color density after being frozen for 30 days it retains 50% of its natural color density after being boiled for 3 hours it retains 60% of its natural color density after being exposed to direct sunlight for 3 months content of anthocyans in the colorant corresponds to the following ratio, namely pelargonidin glycoside:peonidin glycoside:cyanidin glycoside must correlate as 1:2:3 respectively.

TABLE 1

| Example No. | $\lambda$, nm | Resistance to pH of environment | Resistance to freezing, % | Resistance to boiling, % | Resistance to sunlight, % |
|---|---|---|---|---|---|
| 1 | 515 | 2–7 | 95 | 90 | 98 |
| 2 | 505 | 2–7 | 80 | 80 | 80 |
| 3 | 513 | 2–7 | 90 | 95 | 100 |
| 4 | 525 | 2–4 | 40 | 35 | 50 |
| 5 | 540 | 2–5 | 30 | 25 | 60 |
| 6 | 516 | 2–6 | 90 | 50 | 60 |

$\lambda$ - length of light wave, when relative optical density of the colorant solution is the highest.

BEST COLORANT COMPOSITION

The results given in Table 1 prove that the proposed colorant is resistant to unfavorable factors, such as freezing, boiling and exposure to direct sunlight. Examples No. 1–No. 3 are the most optimum as they are prepared on the basis of the proposed process, which provides for production of more concentrated and stable colorant in the form of transparent thick liquid of murrey color that is soluble completely in water and in aqueous solutions of ethyl alcohol. It has weak specific smell that is typical for primary material. It has a sour taste, dry substance content is 35%; and coloring matter content is 70 g/l. The colorant retains red color when environment pH is 6. The colorant is thermostable and photostable, and such properties expand the possibilities for its use.

DETAILED DESCRIPTION OF COLORANT PRODUCTION PROCESS

In another aspect, the present invention provides a process for production of colorant containing anthocyan that includes growing, grinding, extraction of coloring matter in acid aqueous solution placed in ultrasonic vibration field, filtration and concentration, when pre-dried vegetable maize-pulp containing anthocyan is used. Extraction is performed by mixed solution of hydrochloric and citric acids, and the coloring matter is concentrated in vacuum. In order to obtain more concentrated and stable colorant, the vegetable primary material may be prepared by infusion of grinded primary material in extracting agent solution during 6–8 hours at the temperature of 35–40° C.

For better colorant quality and concentration it must be extracted at 35–40° C. under permanent temperature control. Extracting is performed by consecutive processing of three lots of vegetable primary material when each lot is processed during 30–40 minutes at 35–40° C., each processed lot is removed and a new lot of primary product is added into prepared extract, and then the colorant is concentrated in vacuum at 50–60° C. and with depression of 750–800 mm of Mercury column. As a result, stable colorant is prepared with concentration of 60–70 g/l and 30–35% of dry substance.

The proposed process will increase the quality of anthocyanic colorant due to higher extraction of anthocyans from primary material and use of vegetable maize-pulp as the primary material.

The process shall be realized as follows: in order to get anthocyanic primary material, maize seeds are planted out in spring and they must have the following electrophoretic spectra of spare proteins: Rf 0.42; 0.44; 0.48; 0.54; 0.56; 0.6; 0.62; 0.66; 0.72; 0.81; 0.88; 0.9; 0.94; 0.96.

Maize is grown using standard technology until complete ripeness. After ripening corn is harvested and vegetable pulp is used as primary material for preparation of the colorant. Vegetable pulp of maize plants is dried in shadow at temperatures of 15–20° C. and natural ventilation.

Primary material that is dried in this way shall retain anthocyans during one year, if stored in dark place, so the primary material may be processed during one year.

The primary material is grinded (particle size is 1–2 mm), placed in extractor and covered with extracting agent: water+HCl 10%+0.1% of citric acid. The mix is agitated and left for infusion for 6–8 hours. Then the material is heated till 35–40° C. During extraction process the mix is subjected to ultrasonic vibration using one of known methods. Cavitation change in pressure due to ultrasonic treatment of the primary material breaks the cell shells and anthocyans come out of cytoplasm and get into extracted mix. As a result of ultrasonic vibration applied to extracting agent, solubility of anthocyans in water is increased, and subsequent intermixing will provide for the highest level of anthocyan extraction. Temperature of extraction is the optimum one for preserving anthocyan molecules in native condition. The first lot of primary material is processed for 30–40 minutes. Then the cake is removed from the extractor and a new lot of prepared primary material is placed into the extract and processing is repeated. Such operation is performed three times and it helps to reduce cost of colorant concentration. At the end of processing cake is separated from extract. The prepared extract is left for 24-hour settling. Then the supernatant is centrifuged and filtered. The colorant is concentrated by evaporation in vacuum at 50–60° C. The prepared colorant is stored in dark sealed vessels. The colorant, which is produced as a result of such process, has the form of transparent thick liquid of murrey color that is completely soluble in water and in aqueous solutions of ethyl alcohol. It has specific smell of the primary product and it tastes sour.

EXAMPLES OF COLORANT PRODUCTION PROCESS

Example No. 7

Maize plants are grown using standard technology and their vegetable pulp is a source of anthocyans. After complete ripeness corn is harvested and vegetative pulp (stems and leaves) is used as primary material for preparation of anthocyanic colorant.

Vegetable pulp of maize plants is dried in shadow at temperatures of 15–20° C. and natural ventilation. Dried material must have maximum 7–10% of moisture. The primary material is grinded (particles size is 1–2 mm), loaded into extractor and covered with extracting agent: water+HCl 10%+1% of citric acid. During extraction process the mix is subjected to ultrasonic vibration. Then the processed primary material is separated from the extract (solution of coloring matter), the extract is settled for 24 hours at t=20–30° C. Then it is centrifuged at 2,000 rpm. The colorant is concentrated by evaporation in vacuum at temperatures of 50–60° C. and with depression of 750–800 mm of Mercury column.

Example No. 8

The process is realized as defined in Example No. 7, but before extraction the grinded primary material containing anthocyan is loaded into extractor, the mix is agitated and left for infusion for 8 hours at room temperature. Such process provides for better extraction of coloring matter from primary materials that contain anthocyan.

Example No. 9

The process is realized as defined in Example No. 7, but before extraction the extractable material is heated till t=40° C. and the extraction process is performed at this temperature and under stringent temperature control.

Example No. 10

The process is realized as defined in Example No. 7, but extraction is performed in three steps, whereas duration of each step is 30–40 min.

During the $1^{st}$ step the prepared primary material is covered with extracting agent, left for 6 hours at room temperature, heated till 40° C., then extracted during 30–40 minutes in ultrasonic vibration field. When the extraction is completed, the processed material is removed from the extractor and new lot of grinded material is loaded into extractor. Processing is repeated and when extraction of the second lot is completed the processed material is separated from extract and a new lot of primary material is loaded.

Such multi-step process provides for colorant concentration at the phase of extraction.

BEST OPTIONS OF INVENTION EMBODIMENT

Optimum colorant compositions as described in Examples 1, 2, 3 have been obtained when the processes as specified in Examples 7–10 were used.

For physical-and chemical parameters of these colorants see Table No. 2. The data presented in Table No. 2 proves that the use of proposed process for preparing anthocyanic colorant from vegetable maize-pulp, which contains anthocyans, will provide for production of a colorant that has physical and chemical properties complying with the requirements for edible colorants.

It should be noted that the proposed process provides for production of high-quality anthocyanic colorant that is resistant to the following unfavorable factors: acid environment, freezing, boiling and exposure to direct sunlight. The colorant is prepared from vegetable maize-pulp containing anthocyans that has not been used for production of natural colorant until present.

TABLE 2

Basic Physical and Chemical Parameters of Colorants Prepared Using Proposed Process

| Parameters | Example 7 | Example 8 | Example 9 | Example 10 |
|---|---|---|---|---|
| 1. Physical form | Transparent thick liquid of murrey color | Transparent thick liquid of murrey color | Transparent thick liquid of murrey color | Transparent thick liquid of murrey color |
| 2. Solubility in water and in aqueous solutions of ethyl alcohol | Completely, solution is transparent | Completely, solution is transparent | Completely, solution is transparent | Completely, solution is transparent |
| 3. Density, g/decimeter$^3$ | 1.045 | 1.107 | 1.128 | 1.35 |
| 4. Percentage of dry substance mass, % | 10 | 30.5 | 24 | 35 |
| 5. Active acidity, pH | 3.45 | 4.55 | 4.96 | 4.9 |
| 6. Concentration of coloring matter, g/l | 20 | 38 | 50 | 70 |

Colorants that have been prepared by the proposed process are described in Examples 1, 2, 3 and have the form of transparent thick liquid of murrey color that may be solved completely in water and in aqueous solutions of ethyl alcohol. It has weak specific smell that is typical for primary material. It has a sour taste, dry substance content is 35%; and coloring matter content is 70 g/l. The colorant retains red color when environment pH is 6. The colorant is thermostable and photostable, and such properties expand the possibilities for its use.

COMMERCIAL APPLICATION

1. Colorant Use in Confectionery Industry

In order to study feasibility of the natural colorant use in confectionery industry, a number of experiments was made to examine possibility to use the colorant in production of sugar caramel, pomade, fruit jelly and cream. For the results of this experiment see Table No. 3.

TABLE NO.3

| Product | Proportion of red colorant, grams in 1 kg of finished product according to formulation | Weight of coloring matter, grams in 1 kg of finished product | Product color |
|---|---|---|---|
| Sugar caramel | 0.750 | 0.625 | Rich pink with cream tint |
| Pomade | 0.260 | 0.250 | Soft pink |
|  |  | 0.375 | Nice pink |
| Fruit jelly | 0.750 | 0.750 | Nice pink |
| Cream | — | 0.375–1.500 | From pink-pale with cream tint to rich pink |

The performed research demonstrated that the colorant may be used in production of confectionery, including caramel, pomade, jelly, cream with the purpose of giving them a nice pink color. Richness of such color shall depend on the composition and proportion of anthocyans in the colorant. The natural colorant may be recommended for wide-scale use in confectionery industry.

2. Colorant Use in Production of Soft Drinks

For the results of studying the possibility to use the natural colorant in production of soft drinks see Table No. 4.

TABLE NO.4

| Drink name | Proportion of red colorant, ml in 1 liter of finished product | Product color |
|---|---|---|
| "Cherry" | 25 | Murrey with cherries tint |
| "Wood Berry" | 20 | Murrey with red bilberries tint |
| "Raspberry" | 15 | Rich pink with raspberries tint |

As it has been demonstrated by the results of the experiment, the color of soft drink depends on the volume of added colorant solution. Richness of the color depends on composition and proportion of anthocyans in the colorant. Color of the drink may be changed through varying the composition. The natural colorant may be recommended for wide-scale use in production of soft drinks.

3. Use of Colorant in Production of Alcoholic Drinks

A research was performed to study the possibility to use the natural colorant in production of alcoholic drinks: vodkas, wines, liqueurs. For the results of research in using the natural colorant for production of alcoholic drinks see Table No. 5.

TABLE NO.5

| Liqueur name | Proportion of red colorant, ml in 1 liter of finished product | Product color |
|---|---|---|
| "Cranberry" | 30.5 | Murrey with cranberries tint |
| "Raspberry" | 28.4 | Rich pink with raspberries tint |
| "Blackberry" | 21.5 | Rich pink with lilac tint |

As it has been demonstrated by the results of the experiment, the color of alcoholic drink depends on the volume of added colorant solution. Richness of the color depends on composition and proportion of anthocyans in the colorant. Color of the drink may be changed through varying the composition. The natural colorant may be recommended for wide-scale use in production of alcoholic drinks.

4. Using Colorant in Production of Ice-Cream

A research was made to study the possibility to use the colorant in production of ice-cream. The results of the experiment have demonstrated that the colorant may be used for production of two kinds of ice-cream: blackberry and black-currant. For production of black-currant ice-cream the colorant is mixed with the main component (white ice-cream without filling agent) in proportion of 1:1 and the color is warn rich pink. If the colorant is mixed with the main component in proportion of 1:20, the color will be cool lilac pink, which is typical for blackberry ice-cream.

What is claimed is:

1. An anthocyanic colorant composition prepared from a corn vegetable pulp, comprising cyanidin glycosides, peonidin glycosides, organic substances, mineral salts, and pelargonidin glycosides, wherein component percentages are as follows:

|  | percent |
|---|---|
| cyanidin glycoside | 0.1–8.6 |
| peonidin glycoside | 0.08–6.45 |
| pelargonidin glycoside | 0.05–4.3 |
| organic substance and mineral salts. | the balance |

2. The anthocyanic colorant according to claim 1, wherein the ratio of pelargonidin glycosides:peonidin glycosides:cyanidin glycosides is 1:1.5:2, and wherein the relative optical density is highest when it is exposed to direct light with a wavelength of 505–515 nm.

3. An anthocyanic colorant composition prepared from a corn vegetable pulp comprising cyanidin glycosides, peonidin, glycosides, organic substances, mineral salts, and pelargonidin glycosides, wherein component percentages are as follows:

|  | percent |
|---|---|
| cyanidin glycoside | 0.1–8.6 |
| peonidin glycoside | 0.08–6.45 |
| pelargonidin glycoside | 0.05–4.3 |
| organic substance and mineral salts, | the balance | wherein its natural red color is retained when it is exposed to an acid environment having a pH from 2.0 to less than 7.0.

4. An anthocyanic colorant composition prepared from a corn vegetable pulp comprising cyanidin glycosides, peonidin glycosides, organic substances, mineral salts, and pelargonidin glycosides, wherein component percentages are as follows:

|  | percent |
|---|---|
| cyanidin glycoside | 0.1–8.6 |
| peonidin glycoside | 0.08–6.45 |
| pelargonidin glycoside | 0.05–4.3 |
| organic substance and mineral salts, | the balance | wherein the ratio of pelargonidin glycosides:peonidin glycosides:cyanidin glycosides is 1:1.5:2, and wherein the relative optical density is highest when it is exposed to direct light with a wavelength of 505–515 nm, and wherein its natural red color is retained when it is exposed to an acid environment having a pH from 2.0 to less than 7.0.

5. An anthocyanic colorant composition prepared from a corn vegetable pulp comprising cyanidin glycosides, peonidin glycosides, organic substances, mineral salts, and pelargonidin glycosides, wherein component percentages are as follows:

|  | percent |
|---|---|
| cyanidin glycoside | 0.1–8.6 |
| peonidin glycoside | 0.08–6.45 |
| pelargonidin glycoside | 0.05–4.3 |
| organic substance and mineral salts, | the balance | wherein 80–100% of its natural color density is retained when exposed to freezing, boiling, direct solar radiation, and/or an acid environment having a pH of from 2 to 4.

6. An anthocyanic colorant composition prepared from a corn vegetable pulp comprising cyanidin glycosides, peonidin glycosides, organic substances, mineral salts, and pelargonidin glycosides, wherein component percentages are as follows:

|  | percent |
|---|---|
| cyanidin glycoside | 0.1–8.6 |
| peonidin glycoside | 0.08–6.45 |
| pelargonidin glycoside | 0.05–4.3 |
| organic substance and mineral salts, | the balance | wherein the ratio of pelargonidin glycosides:peonidin glycosides:cyanidin glycosides is 1:1.5:2, and wherein the relative optical density is highest when it is exposed to direct light with a wavelength of 505–515 nm, and wherein 80–100% of its natural color density is retained when exposed to freezing, boiling, direct solar radiation, and/or an acid environment having a pH of from 2to4.

7. A process for production of an anthocyanic colorant composition from a raw material comprising the vegetable pulp of corn plants comprising providing dried vegetable pulp of corn plants, grinding said dried vegetable pulp to form ground vegetable pulp, extracting coloring matter from said ground vegetable pulp with an extraction solvent comprising an aqueous solution of hydrochloric acid and citric acid in an ultrasonic vibration field, said extracting comprising contacting a first lot of said ground vegetable pulp with said extraction solvent whereby coloring matter is extracted from said vegetable pulp into said extraction solvent, separating said first lot of vegetable pulp from said extraction solvent containing said coloring matter, contacting a second lot of said ground vegetable matter with said extraction solvent containing said coloring matter whereby coloring matter is extracted from said second lot of vegetable pulp into said extraction solvent containing said coloring matter, separating said second lot of vegetable pulp from said extraction solvent containing said coloring matter, and contacting a third lot of ground vegetable pulp with said extraction solvent containing coloring matter which was separated from said second lot of vegetable pulp whereby coloring matter is extracted from said third lot of vegetable pulp into said extraction solvent containing coloring matter and separating said third lot of vegetable pulp from said extraction solvent containing coloring matter, and concentrating said coloring matter by vacuum distillation of said extraction solvent containing coloring matter which was separated from said third lot of vegetable pulp.

8. The process according to claim 7, wherein said ground vegetable pulp is soaked in said extraction solvent for 6–8 hours at a temperature of 35–40° C. prior to said extracting coloring matter from said ground vegetable pulp and wherein said extraction solvent comprises water, 10% HCl and 0.1 to 1% citric acid.

9. The process according to claim 7, wherein said extracting coloring matter from said ground vegetable pulp is carried out in an ultrasonic vibration field at a temperature of 35–40° C. and wherein said extraction solvent comprises water, 10% HCl and 0.1 to 1% citric acid.

10. The process according to claim 8, wherein said extracting coloring matter from said ground vegetable pulp in an ultrasonic vibration field is carried out at a temperature of 35–40° C. and wherein said extraction solvent comprises water, 10% HCl and 1% citric acid.

11. The process according to claim 9, wherein said extraction in said ultrasonic field at a temperature of 35–40° C. is carried out for 30–40 minutes and wherein said extraction solvent comprises water, 10% HCl and 1% citric acid.

12. The process according to claim 10, wherein said extraction in said ultrasonic field at a temperatue of 35–40° C. is carried out for 30–40 minutes.

13. The process according to claim 7, wherein said vacuum distillation is carried out at a temperature of 50–60° C. and at a pressure of 750–800 mm of mercury.

14. The process according to claim 11, wherein said vacuum distillation is carried out at a temperature of 50–60° C. and at a pressure of 750–800 mm of mercury.

15. The process according to claim 12, wherein said vacuum distillation is carried out at a temperature of 50–60° C. and at a pressure of 750–800 mm of mercury.

16. A process for production of an anthocyanic colorant composition from a raw material comprising the vegetable pulp of corn plants comprising providing dried vegetable pulp of corn plants, grinding said dried vegetable pulp to form ground vegetable pulp, extracting coloring matter from said ground vegetable pulp with an extraction solvent comprising an aqueous solution of hydrochloric acid and citric acid in an ultrasonic vibration field, said extracting comprising contacting a first lot of said ground vegetable pulp with said extraction solvent whereby coloring matter is extracted from said vegetable pulp into said extraction solvent, separating said first lot of vegetable pulp from said extraction solvent containing said coloring matter, optionally contacting at least one additional lot of said ground vegetable matter with said extraction solvent containing said coloring matter whereby coloring matter is extracted from a second lot of vegetable pulp into said extraction solvent containing said coloring matter and separating said second lot of vegetable pulp from said extraction solvent containing said coloring matter, and concentrating said coloring matter by vacuum distillation of said extraction solvent containing coloring matter which was separated from said third lot of vegetable pulp.

17. The process according to claim 16, wherein said ground vegetable pulp is soaked in said extraction solvent for 6–8 hours at a temperature of 35–40° C. prior to said extracting coloring matter from said ground vegetable pulp and wherein said extraction solvent comprises water, 10% HCl and 0.1 to 1% citric acid.

* * * * *